United States Patent
Togawa et al.

(10) Patent No.: US 8,820,462 B2
(45) Date of Patent: Sep. 2, 2014

(54) OCCUPANT RESTRAINT SYSTEM AND OCCUPANT RESTRAINT METHOD

(75) Inventors: Atsushi Togawa, Machida (JP); Kouichi Oota, Beijing (CN)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/116,076

(22) PCT Filed: Feb. 24, 2012

(86) PCT No.: PCT/JP2012/054601
§ 371 (c)(1),
(2), (4) Date: Nov. 6, 2013

(87) PCT Pub. No.: WO2012/153560
PCT Pub. Date: Nov. 15, 2012

(65) Prior Publication Data
US 2014/0062070 A1    Mar. 6, 2014

(30) Foreign Application Priority Data
May 11, 2011    (JP) .................................. 2011-106056

(51) Int. Cl.
| B60R 21/18 | (2006.01) |
| B60R 22/46 | (2006.01) |
| B60R 21/232 | (2011.01) |
| B60R 21/231 | (2011.01) |
| B60R 21/0132 | (2006.01) |
| B60R 21/013 | (2006.01) |

(52) U.S. Cl.
CPC ........... *B60R 21/18* (2013.01); *B60R 21/23138* (2013.01); *B60R 21/0132* (2013.01); *B60R 21/232* (2013.01); *B60R 21/013* (2013.01)
USPC ......... 180/268; 280/735; 280/806; 280/730.2

(58) Field of Classification Search
CPC ...... B60R 22/46; B60R 21/18; B60R 21/013; B60R 2021/018
USPC ........... 280/735, 806, 730.2; 180/268; 701/45
See application file for complete search history.

(56) References Cited

U.S. PATENT DOCUMENTS

| 6,241,280 | B1 * | 6/2001 | Biewendt et al. ............. 280/735 |
| 6,908,112 | B2 * | 6/2005 | Yano et al. ..................... 280/805 |
| 2001/0037170 | A1 * | 11/2001 | Morell et al. ................... 701/45 |
| 2001/0038202 | A1 * | 11/2001 | Tobaru et al. ................. 280/805 |

(Continued)

FOREIGN PATENT DOCUMENTS

| JP | 2001-518424 A | 10/2001 |
| JP | 2003-320919 A | 11/2003 |
| JP | 2006-248276 A | 9/2006 |
| JP | 2007-106153 A | 4/2007 |

*Primary Examiner* — Ruth Ilan
(74) *Attorney, Agent, or Firm* — Foley & Lardner LLP (57) ABSTRACT

An occupant restraint system of the present invention includes a curtain airbag (2), a side airbag (4), a seat belt (6) with a built-in pretensioner, and a rollover detection device (11) configured to detect or predict rollover of a vehicle (1). The occupant restraint system further includes a control device (11) configured to perform control of deploying the side airbag when the rollover of the vehicle is detected or predicted by the rollover detection device, activating the pretensioner (19) after a predetermined time elapses from the deployment of the side airbag, and then deploying the curtain airbag.

2 Claims, 11 Drawing Sheets

(56) References Cited

U.S. PATENT DOCUMENTS

| | | | |
|---|---|---|---|
| 2001/0054816 A1* | 12/2001 | Brambilla et al. | 280/806 |
| 2002/0087243 A1* | 7/2002 | Sekizuka et al. | 701/45 |
| 2006/0196715 A1* | 9/2006 | Fujishiro et al. | 180/271 |
| 2006/0284406 A1* | 12/2006 | Enomoto | 280/806 |
| 2007/0017726 A1* | 1/2007 | Takemura | 180/268 |
| 2011/0106383 A1* | 5/2011 | Cluff et al. | 701/45 |

* cited by examiner

OCCUPANT RESTRAINT SYSTEM AND OCCUPANT RESTRAINT METHOD

TECHNICAL FIELD

The present invention relates to an occupant restraint system and an occupant restraint method which restrain and protect an occupant in a case where a vehicle may roll over

BACKGROUND

An increasing number of vehicles include a side airbag, a curtain airbags and a seat belt with built-in pretensioner to protect an occupant of the vehicles, the side airbag being configured to be deployed between the upper body of the occupant and a door, the curtain airbag being configured to be deployed between the head of the occupant and the door. In a vehicle having such features, when the vehicle rolls over toward an outer side of the occupant, the curtain airbag is deployed to prevent the head of the occupant from hitting the door.

However, when the rollover of the vehicle starts, the occupant tends to be close to the outer side (door side) of the vehicle. In this case, a gap between the head of the occupant and a vehicle side wall (a door, a glass, a pillar trim, and the like) is small and this causes a problem that the curtain airbag cannot be smoothly deployed.

To counter this problem, Patent Literature 1 discloses an airbag control system configured to control deployment of a curtain airbag. In this system, when rollover of a vehicle starts, a side airbag is deployed and, at the same time, a pretensioner of a seat belt is activated. This moves an occupant to a vehicle inner side (an opposite side to a door) and secures the occupant to a seat thereby providing a gap between the head of the occupant and a vehicle side wall. Hence, the curtain airbag can be smoothly deployed.

CITATION LIST

Patent Literature

Patent Literature 1: Japanese Patent Application Publication No. 2006-248276

SUMMARY OF INVENTION

However, the conventional example disclosed in Patent Literature 1 described above simultaneously executes the deployment of the side airbag and the activation of the pretensioner. The occupant is thereby pushed to the vehicle inner side by the side airbag while being strongly pushed against a seat back (a backrest portion of the seat) by the seat belt. Hence, the conventional example has a problem that the friction between the occupant and a seat back surface is large and the occupant cannot be smoothly pushed to the vehicle inner side when the side airbag is deployed.

The present invention has been made to solve such a problem in conventional techniques. An object of the present invention is to provide an occupant restraint system and an occupant restraint method which can surely provide a gap between the head of an occupant and a door in rollover of a vehicle to allow smooth deployment of a curtain airbag.

An occupant restraint system of a first aspect of the present invention includes a curtain airbag, a side bag, a seat belt with a built-in pretensioner, and a rollover detection device configured to detect or predict rollover of a vehicle. The occupant restraint system further includes a control device configured to perform control of deploying the side airbag when the rollover of the vehicle is detected or predicted by the rollover detection device, activating the pretensioner after a predetermined time elapses from the deployment of the side bag, and then deploying the curtain airbag.

An occupant restraint method of a second aspect of the present invention includes the steps of: preparing a curtain airbag, a side airbag, and a seat belt with a built-in pretensioner; and detecting or predicting rollover of a vehicle. The occupant restraint method further includes the steps of: deploying the side airbag when the rollover of the vehicle is detected or predicted; and, when the side airbag is deployed, activating the pretensioner after a predetermined time elapses from the deployment. The occupant restraint method also includes the step of deploying the curtain airbag after the pretensioner is activated.

DESCRIPTION OF EMBODIMENTS

Embodiments of the present invention are described below based on the drawings. Note that, in some cases, proportions of dimensions in the drawings may be exaggerated and be different from actual proportions for the sake of description.

Description of First Embodiment

Figure 1:
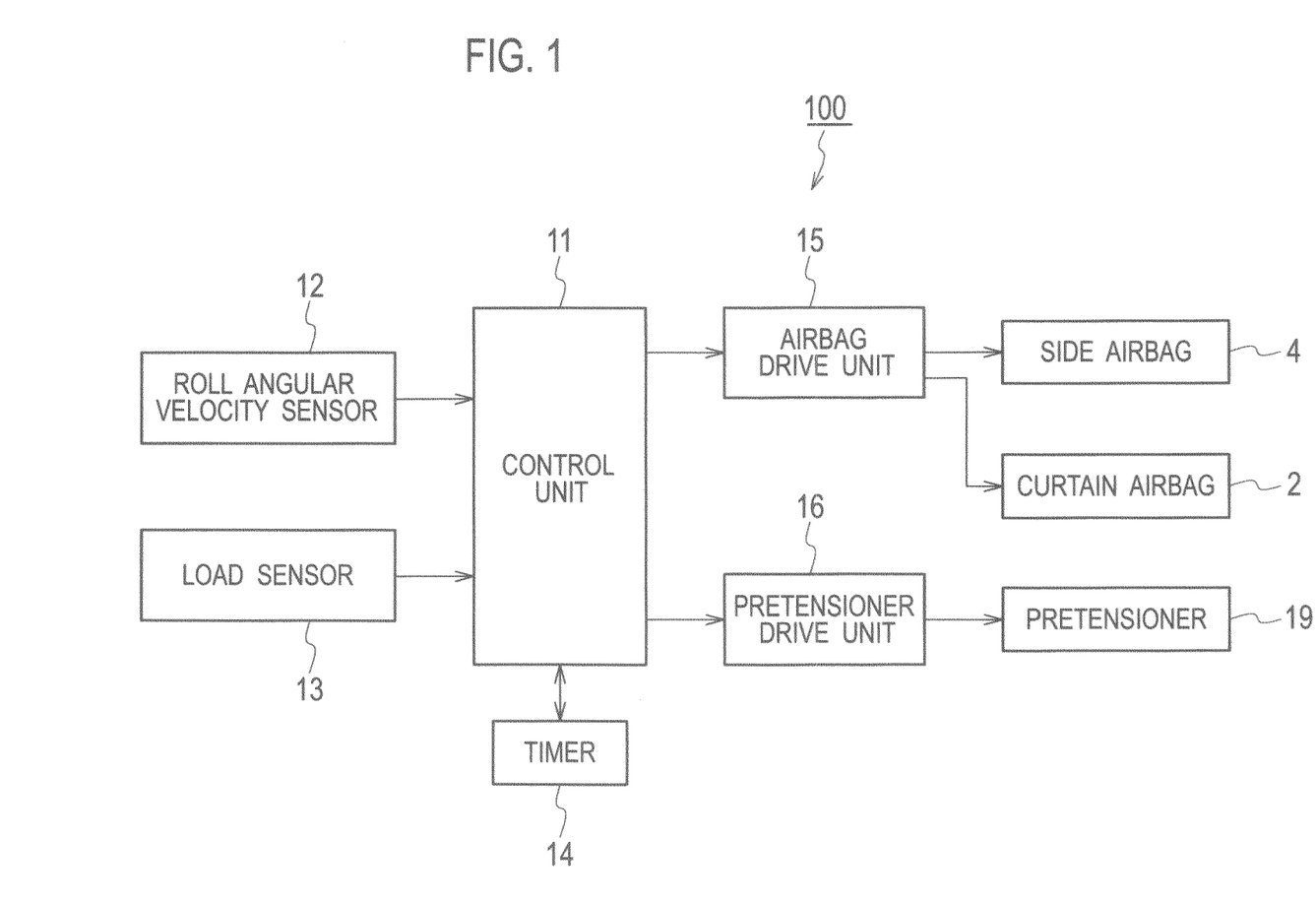
FIG. 1 is a block diagram showing a configuration of occupant restraint system in a first embodiment of the present invention.

FIG. 1 is a block diagram showing a configuration of an occupant restraint system in a first embodiment of the present invention. As shown in the drawings, an occupant restraint system 100 includes a roll angular velocity sensor 12 configured to detect acceleration of a roll angle generated in a vehicle and a load sensor 13 configured to detect whether an occupant is seated on any of a driver seat and a front passenger seat. Moreover, the occupant restraint system 100 includes a control unit 11 configured to perform overall control and a timer 14 configured to count a time.

Furthermore, the occupant restraint system 100 includes a side airbag 4 provided on a vehicle side wall side of a driver seat and configured to be deployed between the upper body of the occupant (driver) and the vehicle side wall when activated and a curtain airbag 2 configured to be deployed between the head of the occupant and the vehicle side wall when activated. Moreover, the occupant restraint system 100 includes an airbag drive unit 15 configured to control drive of the airbags 2, 4.

Moreover, the occupant restraint system 100 includes a pretensioner 19 configured to retract a seat belt in a short time to secure the occupant to a seat back (a backrest portion of the seat) and a seat cushion (a seating portion of the seat) in a case where the occupant is restrained by the seat belt. Furthermore, occupant restraint system 100 includes a pretensioner drive unit 16 configured to control drive of the pretensioner 19. Although the side airbag 4, the curtain airbag 2, and the pretensioner 19 are actually provided on the front passenger seat side, only those on the driver seat side are described in the embodiment to simplify the explanation.

The control unit 11 performs processing of determining whether a driver is seated in the vehicle and whether an occupant is seated on the front passenger seat on the basis of a detection signal from the load sensor 13. Moreover, the control unit 11 performs processing of calculating the angle of the vehicle in a roll direction by integrating an angular velocity signal outputted from the roll angular velocity sensor 12, and determining whether the vehicle is to roll over on the basis of the angle and the angular velocity. In other words, the control unit 11 also has a function of a rollover detection device. If the control unit 11 determines that the vehicle is to roll over, the control unit 11 executes processing of outputting activation signals to activate the side airbag 4, the pretensioner 19, and the curtain airbag 2, through a procedure to be described later.

Next, operations of the occupant restraint system 100 in the first embodiment are described with reference to the explanatory views show in FIGS. 2 to 5 and the flowchart shown in FIG. 6.

Figure 6:
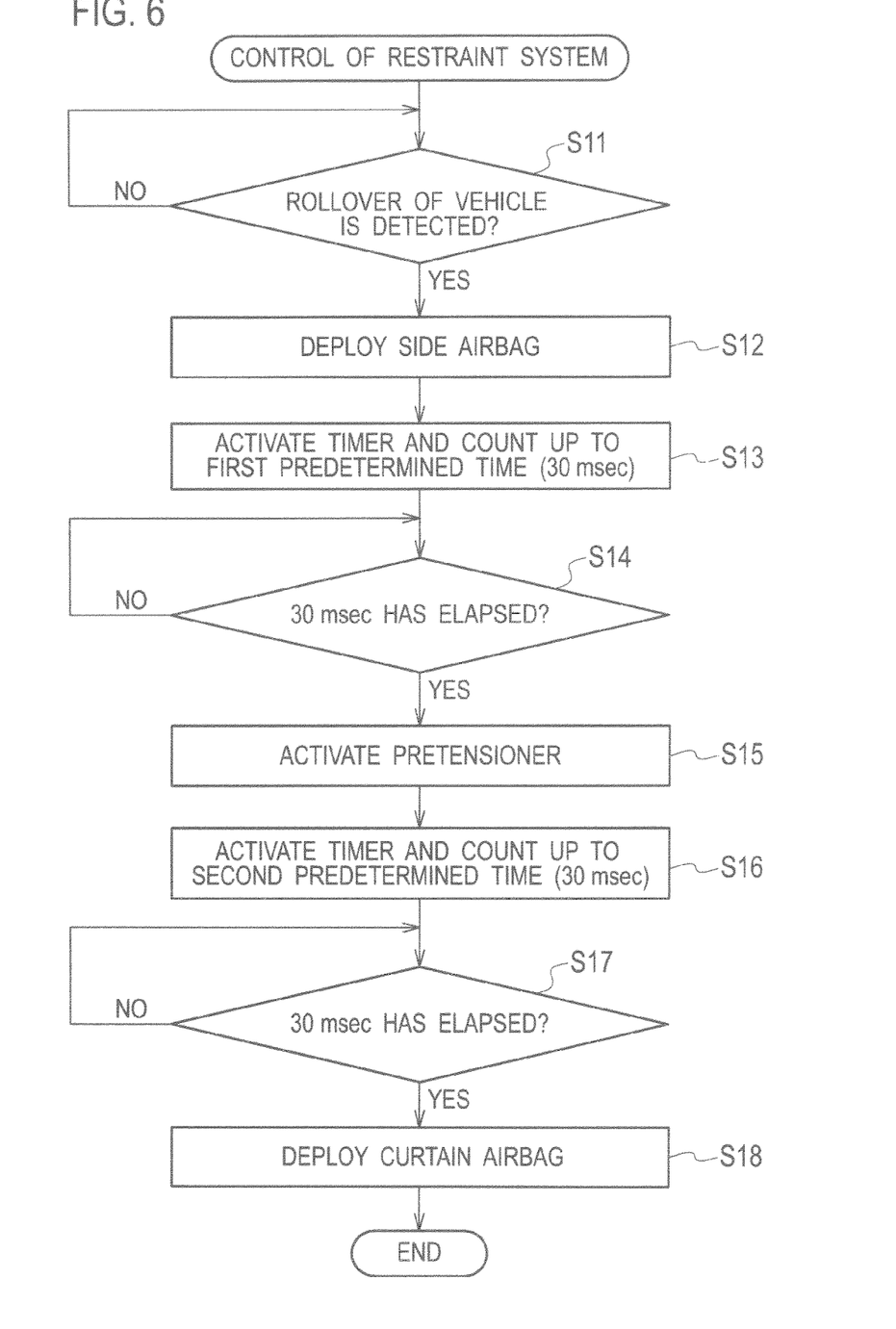
FIG. 6 is a flowchart showing an operation of the occupant restraint system in the first embodiment of the present invention.

First, in step S11 of FIG. 6, the control unit 11 determines whether the rollover of the vehicle is detected. As described above, this processing is performed based on the angular velocity outputted from the roll angular velocity sensor 12 and the angle obtained by integrating the angular velocity. The control unit 11 detects the rollover from the angular velocity and the angle when the vehicle rolls in the roll direction (direction of the arrow Y1 in FIG. 2) and the rollover of the vehicle is inevitable (when the rollover is sure to occur). Note that the control unit 11 may predict the rollover of the vehicle.

Figure 2:
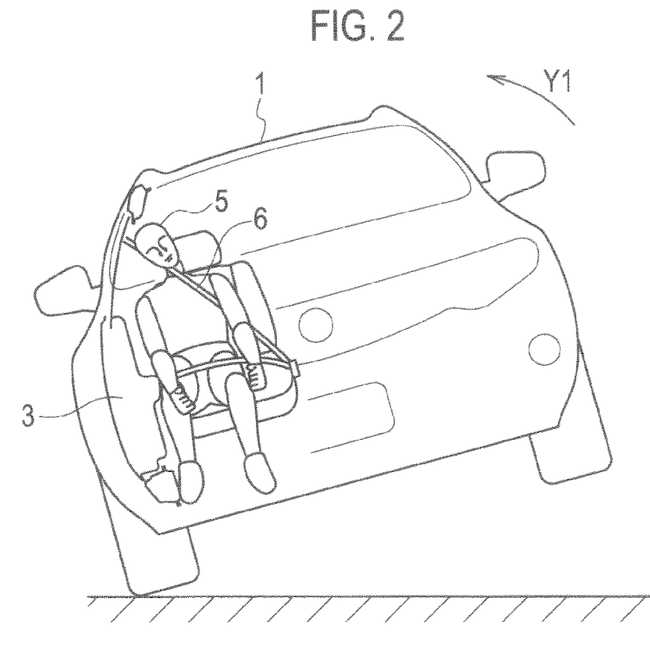
FIG. 2 is an explanatory view showing an operation state of the occupant restraint system in the first embodiment of the present invention and shows a state where a vehicle starts to roll over.

In this case, since the vehicle slips sideways and then rolls over, an occupant 5 of a vehicle 1 moves to a vehicle outer side as shown in FIG. 2 due to an inertia force attributable to deceleration in a left-right direction which is generated in the side slip before the rollover. Accordingly, a space between the head of the occupant 5 and a vehicle side wall 3 (a door, a glass, a pillar, and the like) is reduced. When the vehicle 1 rolls over with the occupant being in the posture shown in FIG. 2, the occupant 5 rolls together with the vehicle 1 in a case where the angle of the vehicle 1 in the roll direction is small. Accordingly, the curtain airbag is deployed in a state where the space between the head of the occupant 5 and the vehicle side wall is small. As a result, there is a risk that the curtain airbag is caught by the head of the occupant 5 or is deployed on a vehicle inner side of the head of the occupant 5. In such cases, the curtain airbag cannot be smoothly deployed. In the embodiment, this situation is avoided by performing the operation described below.

If the rollover of the vehicle is detected (YES in step S11), the processing proceeds to step S12.

Figure 3:
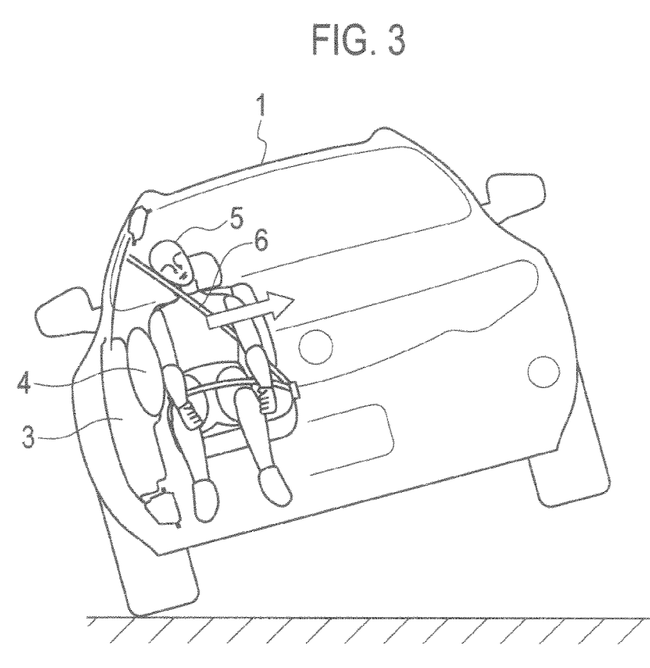
FIG. 3 is an explanatory view showing the operation state of the occupant restraint system in the first embodiment of the present invention and shows a state where a side airbag is deployed.

In step S12, the control unit 11 outputs a drive signal to the airbag drive unit to deploy the side airbag 4. As a result, as shown in FIG. 3, the deployed side airbag 4 expands between the occupant 5 and the vehicle side wall 3. Hence, the occupant 5 is pushed by the side airbag 4 to be moved to the vehicle inner side and the space between the head of the occupant and the vehicle side wall 3 is increased. In this case, since the pretensioner 19 is not activated, the friction force between the occupant 5 and a seat back surface is not increased. Accordingly, the occupant 5 can be easily moved to the vehicle inner side.

In step S13 the control unit 11 activates the timer 14 and the timer 14 counts up to a first predetermined time (for example, 30 msec).

In step S14, the control unit 11 determines whether the timer 14 has counted up to 30 msec. If the timer 14 has counted up to 30 msec, the processing proceeds to step S15.

Figure 4:
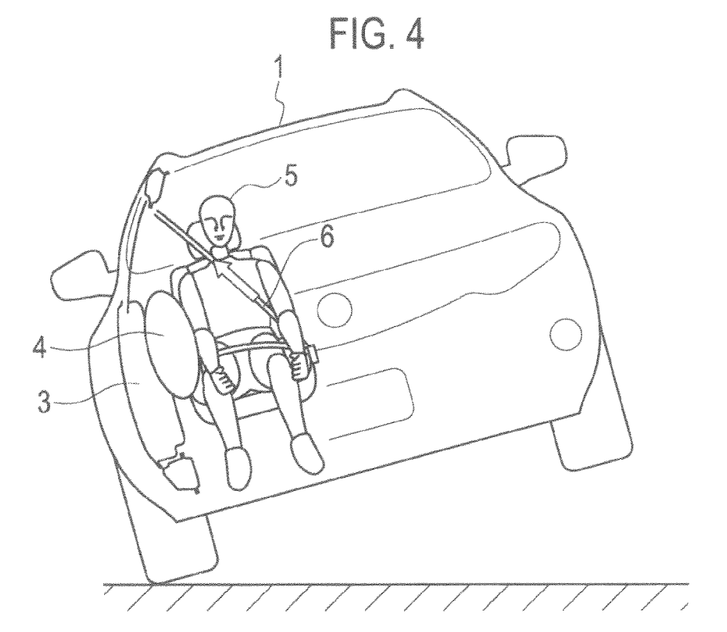
FIG. 4 is an explanatory view showing the operation state of the occupant restraint system in the first embodiment of the present invention and shows a state where a pretensioner is activated.

In step S15, the control unit 11 outputs an activation signal to the pretensioner drive unit 16 to activate the pretensioner 19. As shown in FIG. 4, since the pretensioner 19 retracts a seat belt 6 upward, the seat belt 6 presses the occupant 5 to the seat back side and the posture of the occupant 5 moved to the vehicle inner side is maintained. As a result, a space for deploying the curtain airbag 2, i.e. the space between the head of the occupant and the vehicle side wall can be maintained.

In step S16, the control unit 11 activates the timer 14 and the timer 14 counts up to a second predetermined time (for example, 30 msec).

In step S17, the control unit 11 determines whether the timer 14 has counted up to 30 msec. If the timer 14 has counted up to 30 msec, the processing proceeds to step S18.

Figure 5:
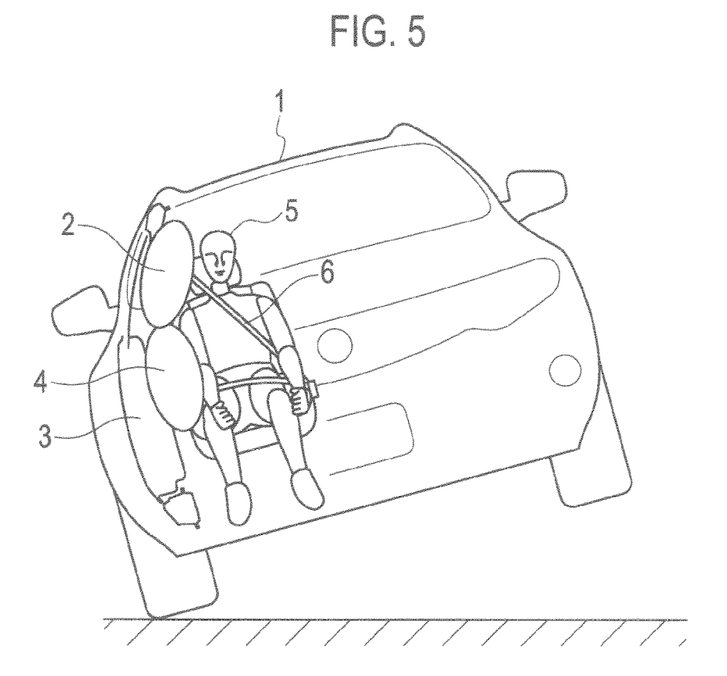
FIG. 5 is an explanatory view showing the operation state of the occupant restraint system in the first embodiment of the present invention and shows a state where a curtain airbag is deployed.

In step S18, the control unit 11 outputs a drive signal to the airbag drive unit 15 to deploy the curtain airbag 2. As a result, as shown in FIG. 5, the curtain airbag 2 is deployed in a state where the space between the head of the occupant and the vehicle side wall 3 is secured. Hence, the curtain airbag 2 can be surely deployed. Specifically, the curtain airbag 2 can be smoothly deployed even when the vehicle starts to roll in the roll direction and the rollover of the vehicle starts with the occupant 5 being close to the vehicle side wall 3.

As described above, in the occupant restraint system 100 of the embodiment, even when the head of the occupant is close to the vehicle side wall 3 in the start of the rollover of the vehicle 1, the side airbag 4 is first deployed to move the occupant 5 to the vehicle inner side. Thereafter, the pretensioner 19 is activated after the elapse of the first predetermined time (for example, 30 msec) to secure the occupant 5 to the seat back. Accordingly, it is possible to easily move the head of the occupant away from the vehicle side wall 3 and surely secure the space for deploying the curtain airbag 2 between the head of the occupant and the vehicle side wall 3.

Description of Second Embodiment

Figure 7:
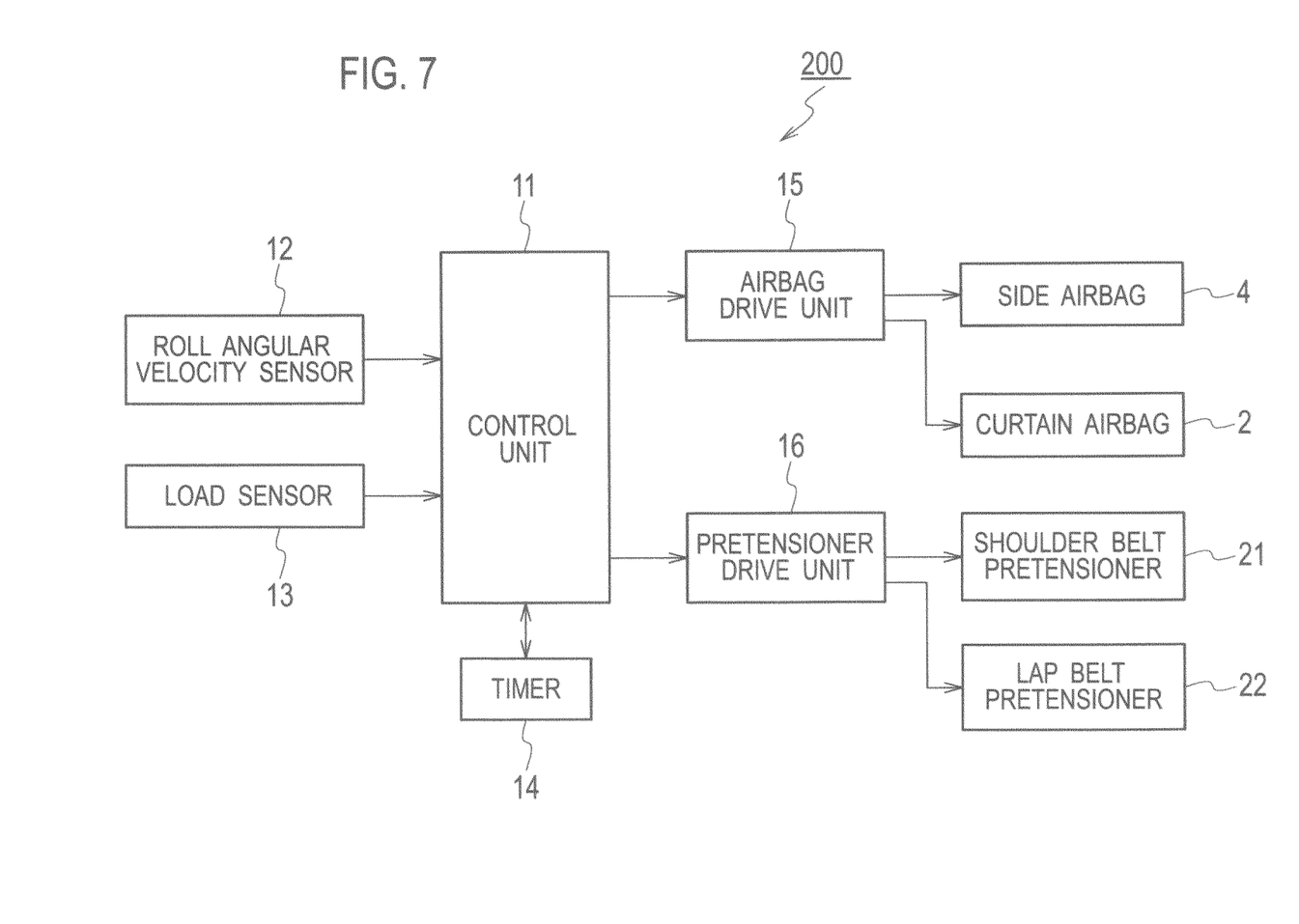
FIG. 7 is a block diagram showing a configuration of an occupant restraint system in a second embodiment of the present invention.
Figure 8:
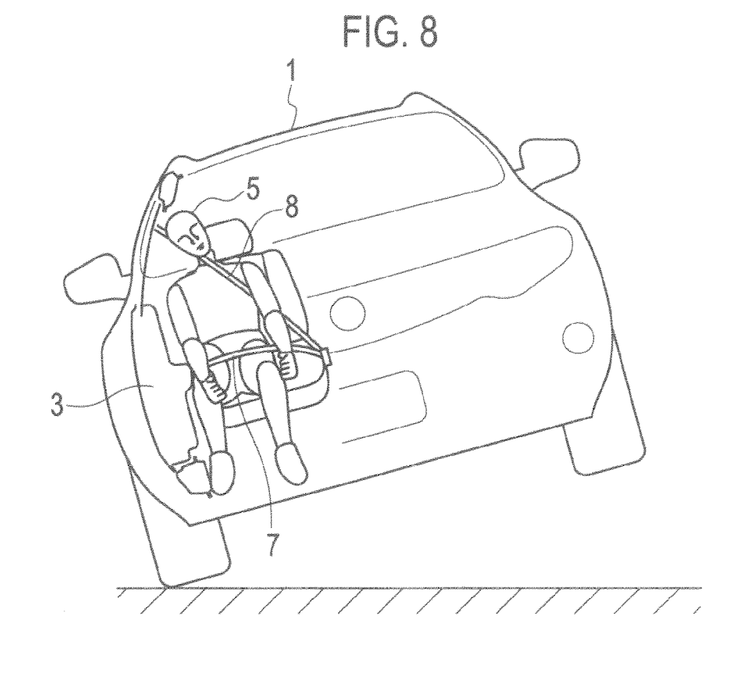
FIG. 8 is an explanatory view showing an operation state of the occupant restraint system in the second embodiment of the present invention and shows a state where a vehicle starts to roll over.

Next, an occupant restraint system in a second embodiment of the present invention is described. FIG. 7 is a block diagram showing a configuration of an occupant restraint system 200 in the second embodiment. As shown in FIG. 7, the occupant restraint system 200 of the embodiment is different from the occupant restraint system 100 shown in FIG. 1 in that a pretensioner 19 is formed of two pretensioners of a shoulder belt pretensioner 21 and a lap belt pretensioner 22. Specifically, as shown in FIG. 8, a seat belt for restraining an occupant includes two belts of a lap belt 7 for securing the waist of the occupant to a seat cushion and a shoulder belt 8 for securing the upper body of the occupant to a seat back. Furthermore, the pretensioners include the lap belt pretensioner 22 configured to retract the lap belt 7 to a vehicle side wall 3 side and the shoulder belt pretensioner 21 configured to retract the shoulder belt 8 upward. Since other configurations are the same as those of the FIG. 1, the same parts are denoted by the same reference numerals and description of the configurations is omitted.

Next, operations of the occupant restraint system 200 in the second embodiment are described with reference to the explanatory views shown in FIGS. 8 to 11 and the flowchart shown in FIG. 12.

Figure 12:
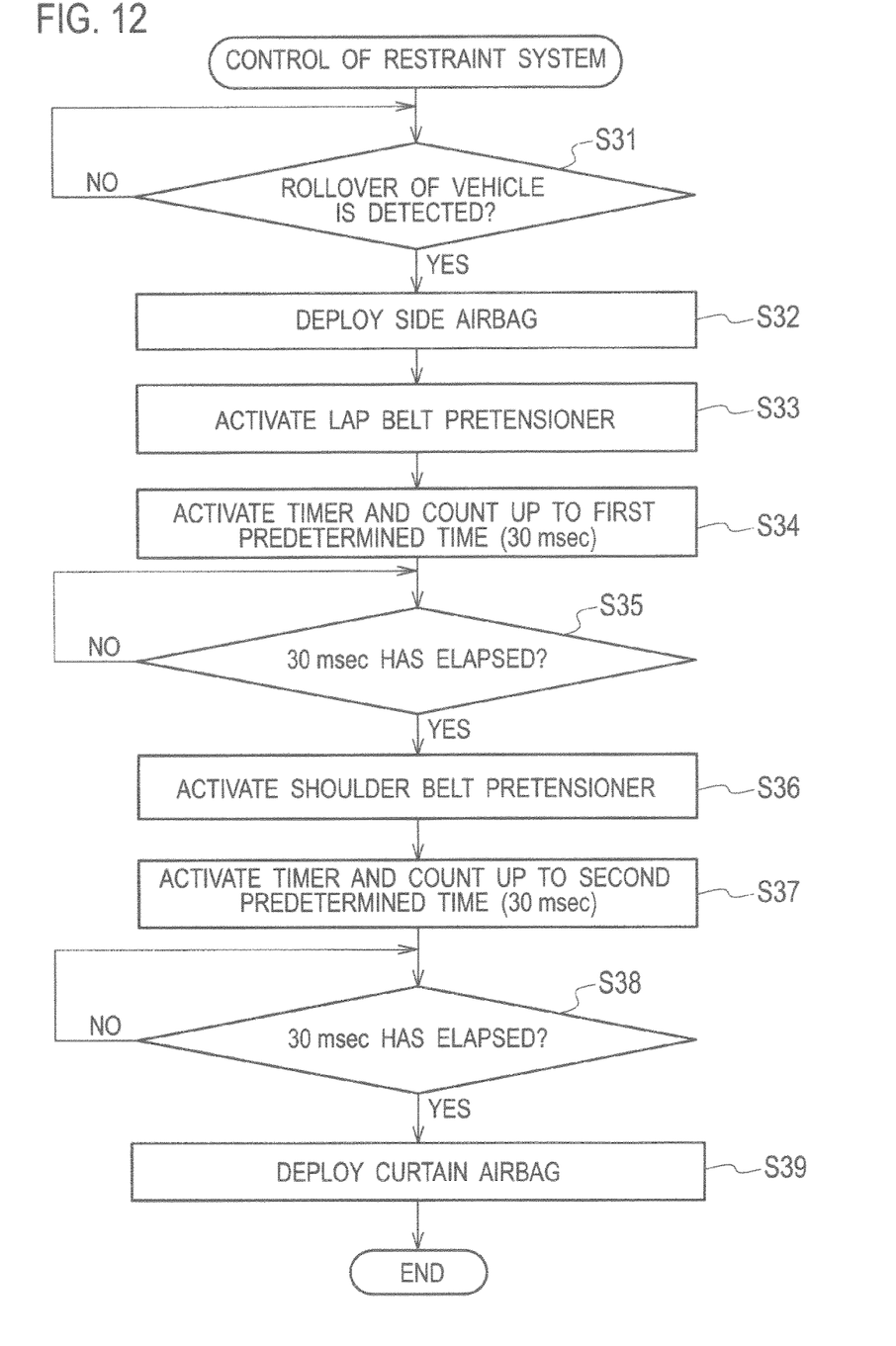
FIG. 12 is a flowchart showing an operation of the occupant restrain system in the second embodiment of the present invention.

First, in step S31 of FIG. 12, a control unit 11 determines whether rollover of a vehicle is detected. As in the first embodiment described above, in this processing, the rollover is detected when the vehicle rolls in a roll direction and the rollover of the vehicle is inevitable. In this case, since the vehicle slips sideways and then rolls over, an occupant 5 of a vehicle 1 moves to a vehicle outer side as shown in FIG. 8 due to an inertia force attributable to deceleration in a left-right direction which is generated in the side slip before the rollover. Accordingly, a space between the head of the occupant and a vehicle side wall 3 (a door, a glass, a pillar, and the like) is reduced. If the rollover of the vehicle is detected (YES in step S31), the processing proceeds to step S32.

In step S32, the control unit 11 outputs a drive signal to an airbag drive unit 5 to deploy the side airbag 4. Moreover, in step S33, the control unit 11 outputs an activation signal to a pretensioner drive unit 16 to activate the lap belt pretensioner 22.

Figure 9:
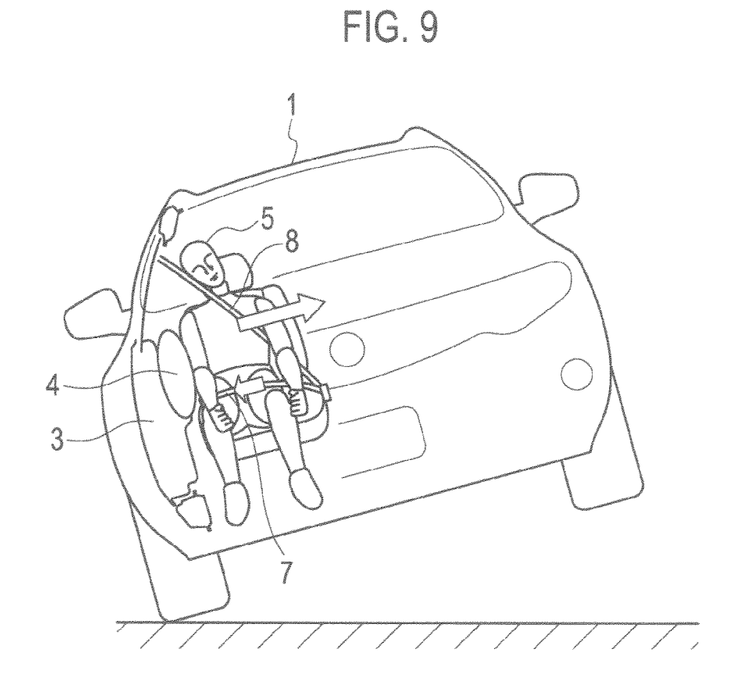
FIG. 9 is an explanatory view showing the operation state of the occupant restraint system in the second embodiment of the present invention and shows a state where a side airbag is deployed and a lap belt pretensioner is activated.

Since the lap belt pretensioner 22 retracts the lap belt 7 in a short time, the lap belt 7 presses the waist of the occupant against the seat cushion and secures the waist as shown in FIG. 9. Accordingly, a side bag 4 expanding between the occupant 5 and the vehicle side wall 3 moves only the upper body of the occupant 5 to the vehicle inner side and a deployment force generated by the expansion of the side airbag 4 can be thus concentrated to the upper body of the occupant 5. Hence, the upper body of the occupant 5 can be easily moved to the vehicle inner side.

In step S34, the control unit 11 activates a timer 14 and the timer 14 counts up to a first predetermined time (for example, 30 msec).

In step S35, the control unit 11 determines whether the timer 14 has counted up to 30 msec. If the timer 14 has counted up to 30 msec, the processing proceeds to step S36.

Figure 10:
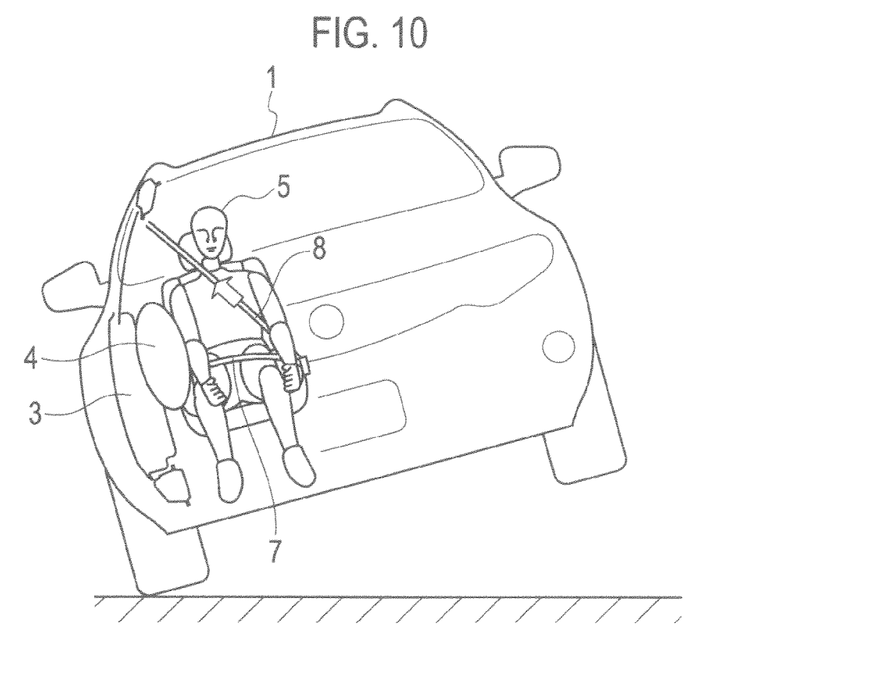
FIG. 10 is an explanatory view showing the operation state of the occupant restraint system in the second embodiment of the present invention and shows a state where a shoulder belt pretensioner is activated.

In step S36, the control unit 11 outputs an activation signal to the pretensioner drive unit 16 to activate the shoulder belt pretensioner 21. As shown in FIG. 10, the shoulder belt pretensioner 21 retracts the shoulder belt 8 upward. Thus, the shoulder belt 8 presses the occupant 5 to the seat back side and the posture of the occupant 5 moved to the vehicle inner side is maintained. As a result, a space for deploying a curtain airbag 2, i.e. the space between the head of the occupant and the vehicle side wall 3 can be maintained.

In step S37, the control unit 11 activates the timer 14 and the timer 14 counts up to a second predetermined time (for example, 30 msec).

In step S38, the control unit 11 determines whether the timer 14 has counted up to 30 msec. It the timer 14 has counted up to 30 msec, the processing proceeds to step S39.

Figure 11:
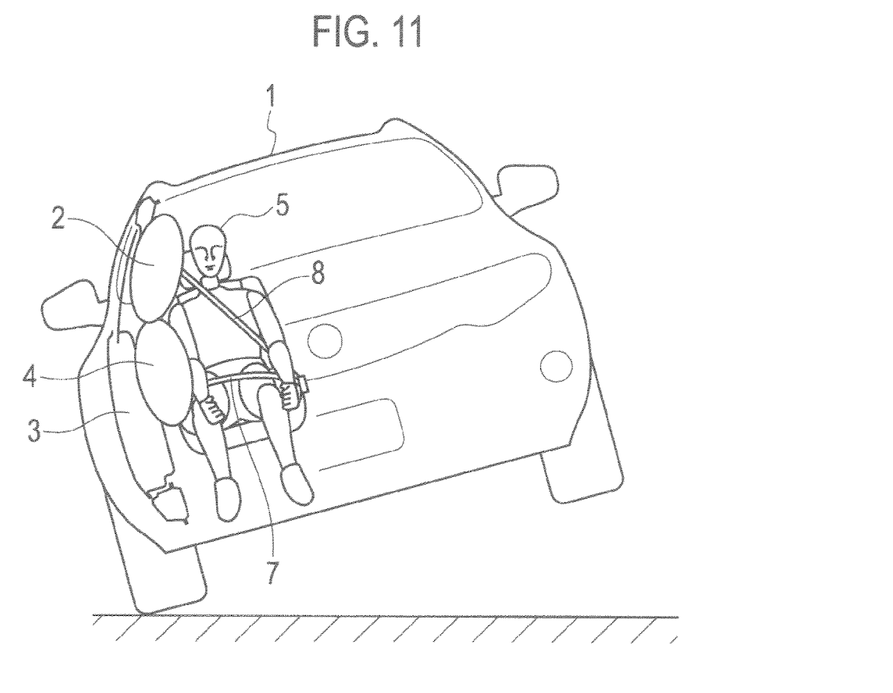
FIG. 11 is an explanatory view showing the operation state of the occupant restraint system in the second embodiment of the present invention and shows a state where a curtain airbag is deployed.

In step S39, the control unit 11 outputs a drive signal to the airbag drive unit 15 to deploy the curtain airbag 2. As a result, as shown in FIG. 11, the curtain airbag 2 is deployed in a state where the space between the head of the occupant and the vehicle side wall 3 is secured. Hence, the curtain airbag 2 can be surely deployed. Specifically, the curtain airbag 2 can be smoothly deployed even when the vehicle starts to roll in the roll direction and the rollover of the vehicle starts with the occupant 5 being close to the vehicle side wall 3.

As described above, in the occupant restraint system 200 of the second embodiment, even when the head of the occupant is close to the vehicle side wall 3 in the start of the rollover of the vehicle 1, the lap belt pretensioner 22 is first activated to secure the waist of the occupant to the seat cushion. Moreover, the side airbag 4 is deployed to move the occupant 5 to the vehicle inner side. Thereafter, the shoulder belt pretensioner 21 is activated after the elapse of the first predetermined time (for example, 30 msec) to secure the occupant 5 to the seat back. Accordingly, it is possible to surely secure the space for deploying the curtain airbag 2 between the head of the occupant and the vehicle side wall 3.

Although the lap belt pretensioner 22 is activated at the same time as the deployment of the side airbag 4 in the second embodiment described above, the lap belt pretensioner 22 may be activated before the deployment of the side airbag 4.

Description of Third Embodiment

Figure 13:
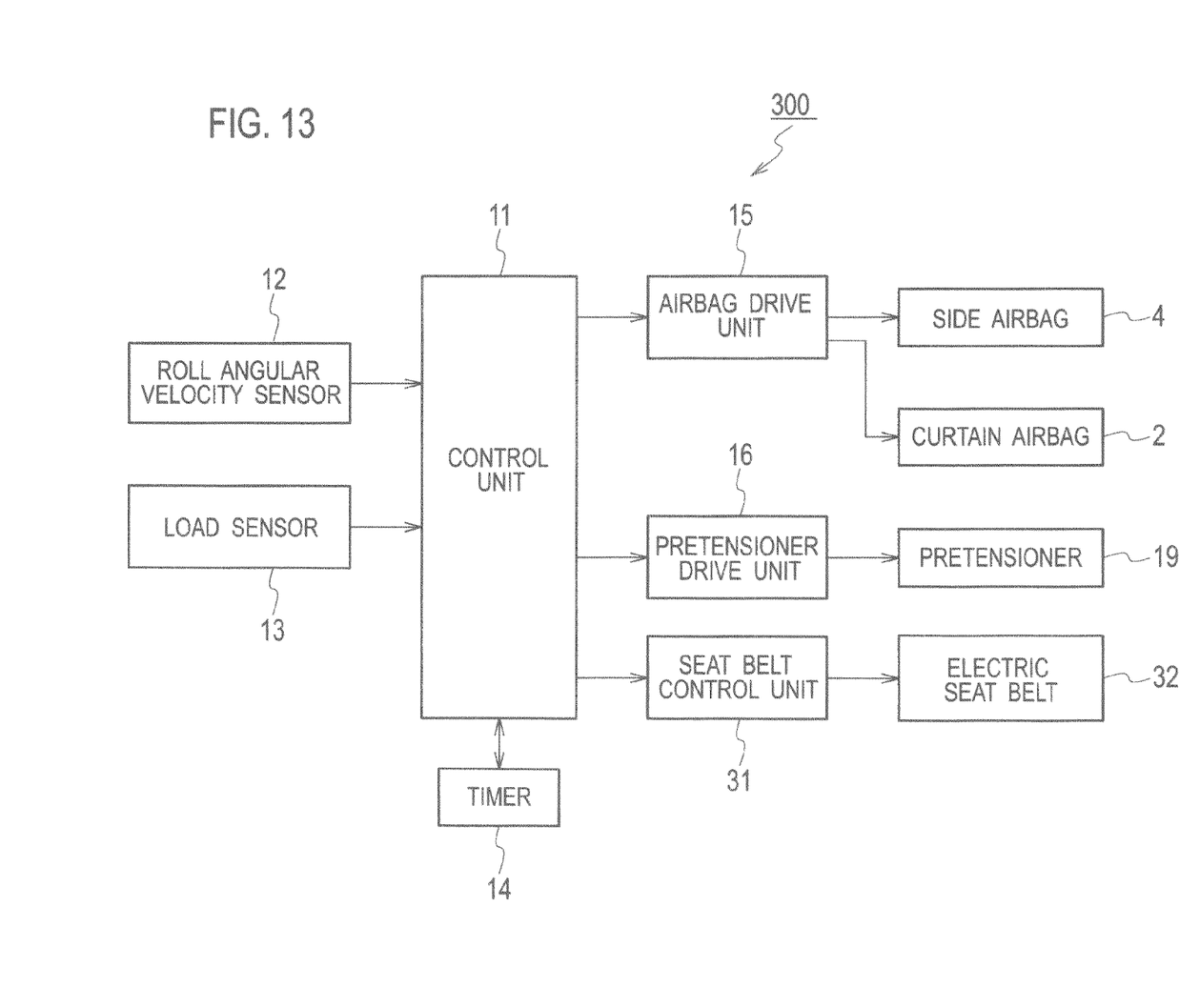
FIG. 13 is a block diagram showing a configuration of an occupant restraint system in a third embodiment of the present invention.

Next, an occupant restraint system in a third embodiment of the present invention is described. FIG. 13 is a block diagram showing a configuration of an occupant restraint system 300 in the third embodiment. As shown in FIG. 13, the occupant restraint system 300 of the third embodiment is different from the occupant restraint system 100 shown in FIG. 1 in that a seat belt is an electric seat belt 32 and in that the occupant restraint system 300 includes a seat belt control unit 31 activated under the control of a control unit 11.

Figure 14:
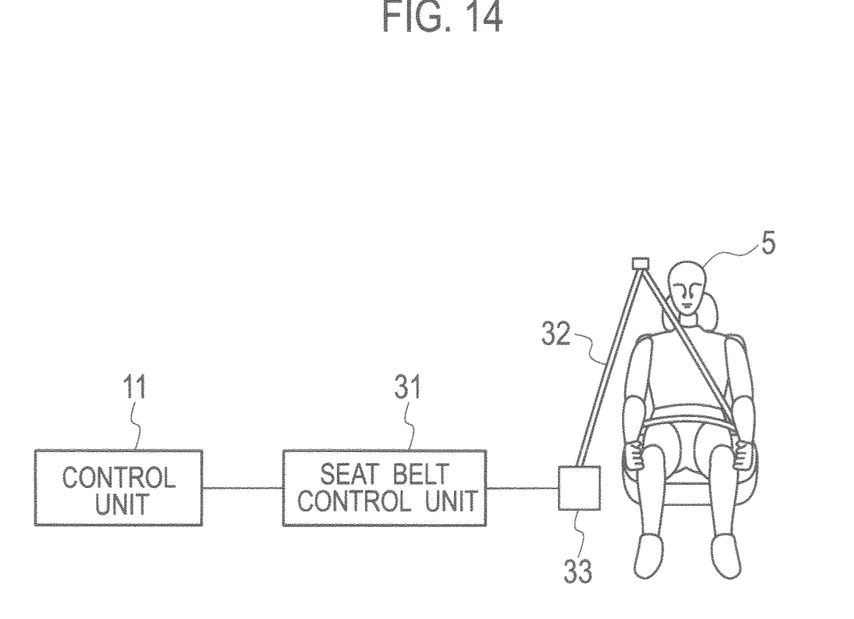
FIG. 14 is an explanatory view showing an electric seat belt of the occupant restraint system in the third embodiment of the present invention.

Specifically, as shown in FIG. 14, an end of the electric seat belt 32 is connected to an electric motor 33. The electric motor 33 is driven by control of the seat belt control unit 31 and tension is generated in the electric seat belt 32 to restrain an occupant. Moreover, the electric seat belt 32 has a function of protecting the occupant by being activated in a case where the occupant needs to be restrained such as a case of sudden braking of a vehicle 1. Note that configurations other than the electric seat belt 32 are the same as those in FIG. 1. Accordingly, the same parts are denoted by the same reference numerals as those in FIG. 1 and the description of the configurations is omitted.

Next, operations of the occupant restraint system 300 in the third embodiment are described with reference to the flowchart shown in FIG. 15.

Figure 15:
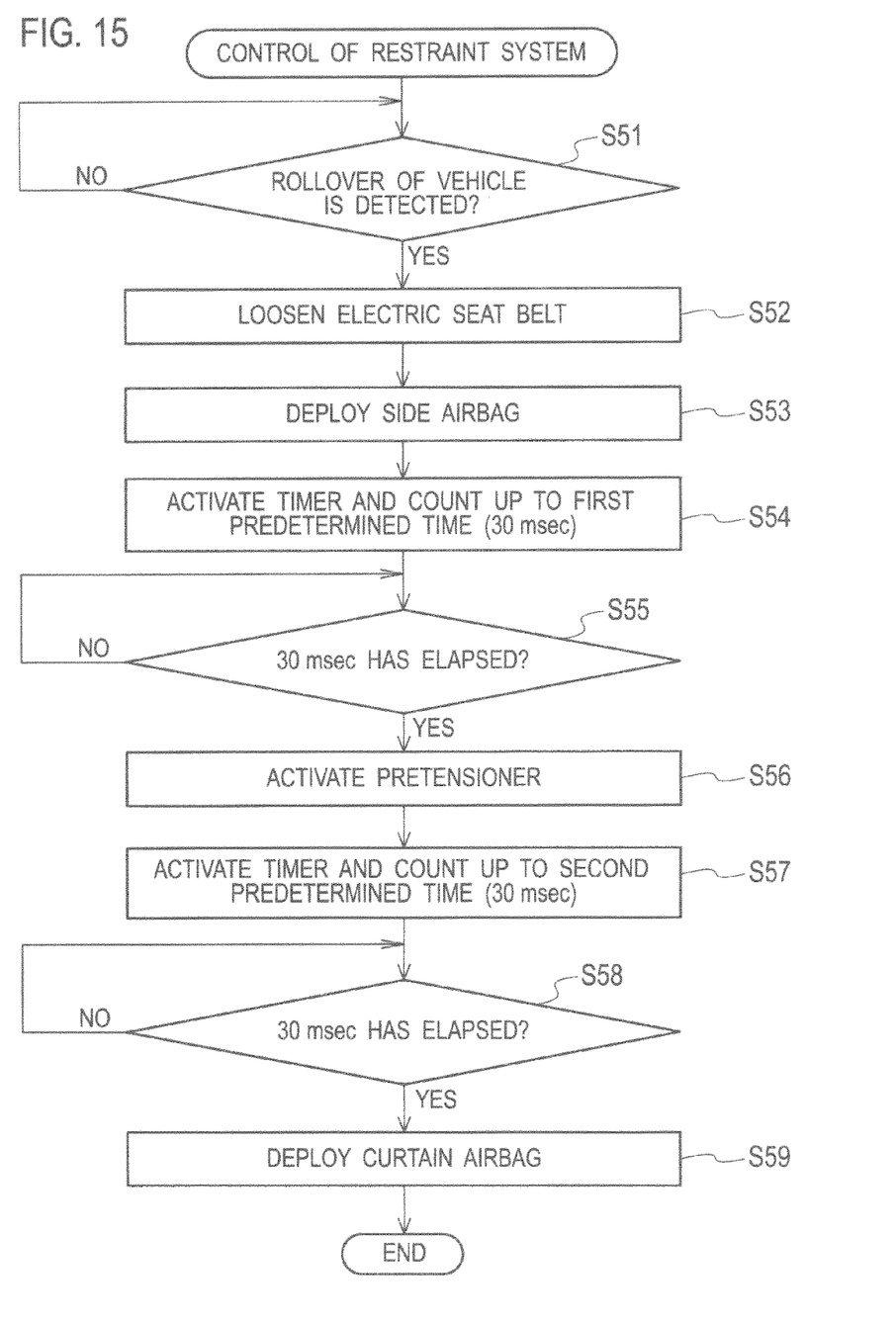
FIG. 15 is a flowchart showing an operation of the occupant restraint system in the third embodiment of the present invention.

First, in step S51 of FIG. 15, the control unit 11 determines whether rollover of the vehicle is detected. As described above, in this processing, the rollover is detected when the vehicle rolls in a roll direction and the rollover of the vehicle is inevitable. If the rollover of the vehicle is detected (YES in step S51), the processing proceeds to step S52.

In step S52, the control unit 11 determines whether tension is applied to the electric seat belt 32. If the tension is applied, the control unit 11 loosens the tension. In other words, the restraint of the occupant by the electric seat belt 32 is released.

Next, in step S53, the control unit 11 outputs a drive signal to the airbag drive unit 15 to deploy the side airbag 4. As a result, as shown in FIG. 3 described above, a space can be provided between the head of the occupant and the vehicle side wall 3. At this time, a pretensioner 19 is not activated and no tension is applied to the electric seat belt 32. Accordingly, the friction force between an occupant 5 and a seat back surface is not large and the space can be easily formed.

In step S54, the control unit 11 activates a timer 14 and the timer 14 counts up to a first predetermined time (for example, 30 msec).

In step S55, the control unit 11 determines whether the timer 14 has counted up to 30 msec. If the timer 14 has counted up to 30 msec, the processing proceeds to step S56.

In step S56, the control unit 11 outputs an activation to the pretensioner drive unit 16 to activate the pretensioner 19. As a result, as shown in FIG. 4 described above, it is possible to maintain the posture of the occupant 5 moved to the vehicle inner side and to maintain the space between the head of the occupant and a vehicle side wall 3.

In step S57, the control unit 11 activates the timer 14 and the timer 14 counts up to a second predetermined time (for example, 30 msec).

In step S58, the control unit 11 determines whether the timer 14 has counted up to 30 msec. If the timer 14 has counted up to 30 msec, the processing proceeds to step S59.

In step S59, the control unit 11 outputs a drive signal to the bag drive unit 15 to deploy the curtain airbag 2. As a result, as shown in FIG. 5 described above, the curtain airbag 2 is can be surely deployed. Specifically, the curtain airbag can be smoothly deployed even when the vehicle starts to roll in the roll direction and the rollover of the vehicle starts with the occupant 5 being close to the vehicle side wall 3.

As described above, the occupant restraint system 300 of the third embodiment can achieve the same effects as those of the first embodiment described above. Moreover, when the occupant is restrained by the electric seat belt 32 the side airbag 4 is deployed after the restraint is loosened. Accordingly, there is no effect due to the restraint of the electric seat belt 32.

The occupant restraint system and the occupant restraint method of the present invention have been described above based on the embodiments illustrated in the drawings. However, the present invention is not limited to this and the configuration of parts can be replaced with any configuration having a similar function.

For example, in the embodiments described above, the first predetermined time and the second predetermined time are both 30 msec. However, in the present invention, these times are not limited to 30 msec and can be set to a different time. Moreover, the first predetermined time and the second predetermined time can be set to times different from each other.

Moreover, in the embodiments described above, description is given of the example in which the curtain airbag 2 is deployed after the second predetermined time (30 msec) elapses from the activation of the pretensioner 19 or the shoulder belt pretensioner 21. However, the occupant restraint system may be configured such that the curtain airbag 2 is deployed without waiting for the elapse of the second predetermined time (i.e. simultaneously).

Moreover, in the embodiment described above, description is given of the case where the curtain airbag 2 on the driver seat side is deployed. However, the present invention can be similarly applied to the front passenger seat side.

The entire contents of Japanese Patent Application No. 2011-106056 (filed May 11, 2011) are incorporated herein by reference.

INDUSTRIAL APPLICABILITY

In the occupant restraint system and the occupant restraint method of the present invention, when the vehicle starts to rollover, the activation of the pretensioner is delayed with respect to the timing at which the side airbag is deployed. Accordingly, it is possible to reduce the resistance generated between the occupant and the seat and smoothly return the occupant to the vehicle inner side. As a result, it is possible to surely secure a space for deploying the curtain airbag between the head of the occupant and the vehicle side wall and smoothly deploy the curtain airbag.

REFERENCE SIGNS LIST 1 vehicle
2 curtain airbag
3 vehicle side wall
4 side airbag
5 occupant
6 seat belt
7 lap belt
8 shoulder belt
11 control unit (rollover detection device)
12 roll angular velocity sensor
13 load sensor
14 timer
15 airbag drive unit
16 pretensioner drive unit
19 pretensioner
21 shoulder belt pretensioner
22 lap belt pretensioner
31 seat belt control unit (electric seat belt control device)
32 electric seat belt
33 electric motor
100, 200, 300 occupant restraint system

The invention claimed is:

1. An occupant restraint system comprising:
a curtain airbag;
a side airbag;
a seat belt with a built-in pretensioner;
a rollover detection device configured to detect or predict rollover of a vehicle; and
a control device configured to perform control of deploying the side airbag when the rollover of the vehicle is detected or predicted by the rollover detection device, activating the pretensioner after a predetermined time elapses from the deployment of the side airbag, and then deploying the curtain airbag, wherein the seat belt includes a lap belt and a shoulder belt, the pretensioner includes a lap belt pretensioner configured to retract the lap belt toward an outer side of an occupant and a shoulder belt pretensioner configured to retract the shoulder belt upward, and when the rollover is detected or predicted, the lap belt pretensioner is activated simultaneously with or before the deployment of the side airbag and then the shoulder belt pretensioner is activated after the predetermined time elapses.

2. An occupant restraint system comprising:

a curtain airbag;

a side airbag;

a seat belt with a built-in pretensioner;

a rollover detection device configured to detect or predict rollover of a vehicle; and a control device configured to perform control of deploying the side airbag when the rollover of the vehicle is detected or predicted by the rollover detection device, activating the pretensioner after a predetermined time elapses from the deployment of the side airbag, and then deploying the curtain airbag, wherein the seat belt is an electric seat belt having a function of being electrically retracted, the occupant restraint system further comprises an electric seat belt control device configured to control tightening of the electric seat belt, and when the rollover is detected or predicted, the electric seat belt control device loosens tension applied to the electric seat belt if the tension is applied, and the control device activates the side airbag after the tension of the electric seat belt is loosened.

\* \* \* \* \*